No. 855,473. PATENTED JUNE 4, 1907.
A. H. McALPINE.
METER.
APPLICATION FILED JAN. 16, 1907.
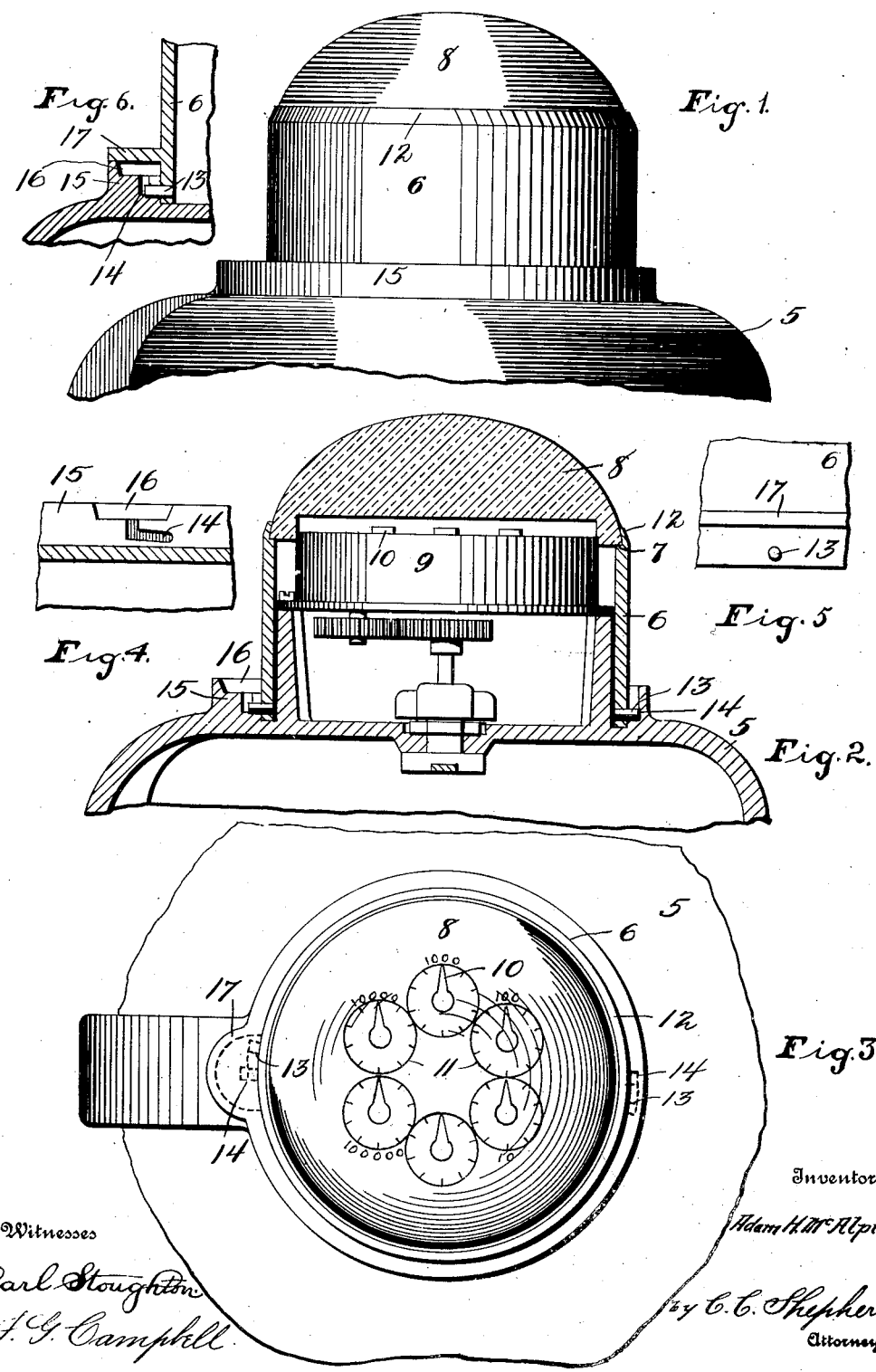

UNITED STATES PATENT OFFICE.

ADAM H. McALPINE, OF COLUMBUS, OHIO.

METER.

No. 855,473.  Specification of Letters Patent.  Patented June 4, 1907.

Application filed January 16, 1907. Serial No. 352,573.

*To all whom it may concern:*

Be it known that I, ADAM H. McALPINE, a citizen of the United States, residing at Columbus, in the county of Franklin and State of Ohio, have invented certain new and useful Improvements in Meters, of which the following is a specification.

My invention relates to water meters and particularly to an improved locking and sealing mechanism between the body portion of the water meter and the cap which covers the registering mechanism, the object of the invention being to provide a device of this character which may be locked in position in such manner as to effectually prevent tampering with the meter registering mechanism.

Further objects and advantages of the invention will be set forth in the detailed description which now follows.

In the accompanying drawing: Figure 1 is a side elevation of the upper portion of a water meter constructed in accordance with the invention, Fig. 2 is a vertical section of said meter, Fig. 3 is a plan view of the meter illustrating a modified form of the device, Fig. 4 is an inside elevation of a flange which is carried by the body portion of the meter, Fig. 5 is an outside elevation of a portion of a modified form of cap, and, Fig. 6 is a detail section illustrating the modified form of the device.

Like numerals designate corresponding parts in all of the figures of the drawing.

Referring to the drawing, the numeral 5 designates the body portion of a water meter. The water meter proper forms no part of the present invention, said invention consisting particularly in the improved method of locking a cap 6 to the body portion of the meter. This cap at its upper end is cut away as at 7 for the reception of a heavy convex glass cover 8, said glass covering the meter registering mechanism which is inclosed in a casing 9, the hands 10 and dials 11 of the meter registering mechanism being visible through said glass. The upper edge of the cap 6 is spun over as at 12 to firmly engage the glass and hold it in position. The lower edge of the cap 6 carries pins 13 which are adapted to engage in cam slots 14 of a flange 15 of the meter body 5. A recessed extension 16 is formed at one side of the cap 6 and serves as a cup for the reception of sealing wax or like material.

The parts illustrated in Figs. 3, 5 and 6 are substantially the same as those hereinbefore described and the same reference numerals have been applied to them, the modification illustrated in this form consisting of a flange 17 which is carried by the cap 6 and is adapted to cover the cup 16 after the cap has been placed in position.

The operation of the device is as follows: The glass having been secured in the cap 6, the body portion of the cap is placed over the meter registering mechanism and the pins 13 are engaged in the cam slots 14, after which sealing wax or like fusible material is poured in the cup 16 and enters the cam slot behind the pins to prevent the removal of the cap 6 and to consequently prevent tampering with the meter registering mechanism.

It has been found that in many instances unscrupulous persons have removed the caps of the water meters and have turned the hands of said meters back. The seal herein shown and described prevents this by indicating to the inspectors whether the meter has been tampered with.

It will be necessary at times to remove the cap 6 for the purpose of making repairs to the meter, but these repairs are usually made at the work-shop of a city water department. When the meter has been removed to such work-shop, it is possible by applying heat to the seal to melt the material and permit retrograde movement of the cap.

In the form of the device illustrated in Figs. 3, 5 and 6 the sealing material such as sealing-wax is poured into the cup 16 after the cap has been forced down as far as possible, but before the pins 13 are moved over into the cam slots. The flange 17 at this time consequently lies a little to one side of the cup 16 to permit the entrance of the molten material. As soon as the cup is filled with this molten material, the cap is given a slight turn to bring the pins into engagement with the cam slots, after which the material is allowed to harden.

The heavy convex glass herein shown and described, serves several useful purposes. It provides a dead-air space between the lower face of the glass and the meter registering mechanism, which prevents sweating of the glass. It likewise magnifies the hands and the dials, thus rendering the reading of the meter an easy matter. Furthermore it is not as liable to breakage as the thin plane glasses heretofore used to cover the registering mechanisms of meters of this character. In many instances these meters are exposed in positions where the glasses are particularly liable to become broken and the provision of a heavy glass of this character is desirable, for even if this glass be broken, the parts are heavy enough to remain in position instead of falling into and upon the hands of the registering mechanism.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

What I claim, is:

1. The combination with the body portion of a meter, of a cap adapted to cover the registering mechanism of the meter, a bayonet joint between said body portion and said cap, and a cup adapted to receive a fusible material located adjacent the bayonet joint.

2. The combination with the body portion of a meter, of a cap adapted to cover the registering mechanism of said meter, a heavy convex glass which forms the top of said cap, a bayonet joint between the cap and the body portion of a meter and a cup adapted to receive a fusible material which communicates with one of the slots of the bayonet joint.

3. The combination with the body portion of a water meter, of an upstanding flange carried by said body portion, bayonet slots formed in said upstanding flange, a cap carrying pins which are adapted to engage in said bayonet slots, and a cup adapted to receive a fusible material, said cup communicating with one of said slots.

4. The combination with the body portion of a water meter, of an upstanding flange carried by said body portion, bayonet slots formed in said upstanding flange, a cap carrying pins which are adapted to engage in said bayonet slots, a cup adapted to receive a fusible material, said cup communicating with one of said slots, and a heavy convex glass forming the top of said cap.

5. In a device of the character described, the combination with the body portion of a water meter, of an upstanding flange having bayonet slots formed therein, a cap adapted to cover the registering mechanism of a meter and carrying members adapted to engage in said bayonet slots, a cup adapted to receive a fusible material which communicates with one of said slots, and a flange carried by the cap which is adapted to overlie and cover the cup when the parts are in their assembled positions.

In testimony whereof I affix my signature in presence of two witnesses.

ADAM H. McALPINE.

Witnesses:
A. L. PHELPS,
L. CARL STOUGHTON.